United States Patent [19]

Takeshita

[11] Patent Number: 4,991,033
[45] Date of Patent: Feb. 5, 1991

[54] SIGNAL PROCESSING METHOD AND DEVICE FOR DIGITAL SIGNAL REPRODUCTION APPARATUS

[75] Inventor: Kazuyuki Takeshita, Hachioji, Japan
[73] Assignee: Hitachi, Ltd., Tokyo, Japan
[21] Appl. No.: 250,117
[22] Filed: Sep. 28, 1988
[30] Foreign Application Priority Data
  Sep. 30, 1987 [JP] Japan .................. 62-243703
[51] Int. Cl.⁵ .............................................. G11B 5/09
[52] U.S. Cl. ..................................... 360/32; 360/49
[58] Field of Search .......................... 360/32, 51, 49
[56] References Cited
  U.S. PATENT DOCUMENTS
  4,758,902  7/1988  Okamoto et al. ............... 360/32
  4,905,104  2/1990  Okamoto et al. ............... 360/32

*Primary Examiner*—Vincent P. Canney
*Attorney, Agent, or Firm*—Antonelli, Terry, Stout & Kraus

[57] ABSTRACT

Signal processing method and apparatus are provided for use in a digital signal reproduction apparatus which reproduces data divided into plural channels and recorded in plural tracks in parallel. Time division operation is applied to digital signals of plural channels read out from plural tracks for every associated reproduction head and at intervals of predetermined unit time interval. In each unit time interval, digital signals of n consecutive units (where n is an integer not less than 2) supplied from associated reproduction heads are multiplexed with a multiplexing factor of n. The above described multiplexed signals of n units supplied from an identical reproduction head are stored into identical addresses of m (where m is an integer not less than 2) memories, respectively. Digital signals supplied from every reproduction head are successively stored into a different address in each memory. Signals stored in identical addresses of the above described respective memories are read out simultaneously and then signals of respective addresses are read out successively.

21 Claims, 16 Drawing Sheets

SIGNAL PROCESSING METHOD AND DEVICE FOR DIGITAL SIGNAL REPRODUCTION APPARATUS

BACKGROUND OF THE INVENTION

1. Field of the Invention

The present invention relates to a digital signal processing method and a digital signal processing device for use in a digital signal reproduction apparatus such as a digital video tape recorder (VTR), and in particular to a signal processing method and a signal processing device for restoring original association relations between channels of reproduced signals and channels of a signal processing circuit which have been interchanged in case the tape speed in reproduction operation is different from that in recording operation when data divided into a plurality of channels and recorded on the tape are to be reproduced.

In a conventional digital signal reproduction apparatus such as a conventional digital VTR, digital signals are distributed into a plurality of channels and are recorded as a plurality of magnetic tracks by a plurality of rotary magnetic heads.

When data thus divided into a plurality of channels and recorded onto the tape are to be recorded and a special reproduction mode such as a variable speed reproduction mode (in which data are reproduced at a tape speed different from the tape speed of the recording operation) other than a normal reproduction mode (in which data are reproduced at the same tape speed as that of the recording operation) is used, the association relations between channels of signals reproduced by a reproduction head and channels of the reproduced signal processing circuit connected to the reproduction head are interchanged. In U.S. Pat. No. 4,392,162, for example, therefore, original association relations are restored by a switch circuit referred to as data interchanger as shown in FIG. 1.

FIG. 1 is a block diagram showing the configuration of the reproduction side shown in the above described U.S. Patent. In FIGS. 1, 1A, 1B and 1C denote reproduction heads for reproducing signals of channels A, B and C respectively recorded on tracks A, B and C, respectively. Further, 30A, 30B and 30C denote reproduction amplifiers, 31A, 31B and 31C reproduction processors, 32A, 32B and 32C time base collectors (TBC), 33 a data interchanger, 34A, 34B and 34C error correction decoders, 35A, 35B and 35C time base expansion circuits, 36 an interface, 37 a D-A converter, 38 an output processor, and 39 an output terminal.

FIG. 2 schematically shows the interchanger 33 and channel memories 4A, 4B and 4C respectively included in the decoders 35A, 35B and 35C of the above described U.S. Patent. The interchanger 33 includes three interchanger circuits (switch circuits) 33A, 33B and 33C respectively supplied with 3-channel input signals 1a, 1b and 1c respectively from TBC's 32A, 32B and 32C.

The 3-channel input signals 1a, 1b and 1c are respectively selected by the interchanger circuits 33A, 33B and 33C, and supplied to respective channel memories 4A, 4B and 4C assigned beforehand as write-in signals 11a, 11b and 11c, respectively. These signals 11a to 11c are written into respective channel memories 4A to 4C and are read out as output signals 7a to 7c when data corresponding to one frame are stored into the memories. The output signals 7a to 7c then undergo error correction.

As described above, the interchanger circuit aims at restoring the original association relations because channels of reproduced signals in the variable speed reproduction mode and channels of the reproducing signal processing circuit are interchanged. At a particular tape speed, however, the processing for restoring the original association relations becomes impossible as described later.

FIG. 3 shows a pattern (reproduced signals) read out by the heads 1A to 1C when signals recorded on a tape 20 by heads disposed at intervals of 120° on the periphery of a drum of a VTR are reproduced at a tape speed which is three times as fast as that of normal reproduction mode.

Signals of the channel A are recorded on tracks A, A', A'', A''' and so on. Signals of the channel B are recorded on tracks B, B', B'', B''', and so on. And signals of the channel C are recorded on tracks C, C', C'', C''' and so on.

Signals of the tracks A, B, C, A', B', C', A'' and so on are reproduced in this order by the head 1A. At this time, signals of the tracks A', B', C', A'', B'', C'', A''' and so on are reproduced by the head 1B in the same way. Signals of the tracks A'', B'', C'', A''', B''', C''' and so on are reproduced by the head 1C.

The first track reproduced by the head 1B is the track A' because the tape speed is three times as fast as that of the normal reproduction mode and the tape moves at a speed which is three times as fast as that of the normal reproduction mode although the time taken for the drum to rotate by 120° is constant. In this case, signal processing becomes very difficult. The reason will now be described. Signals of the same channel are simultaneously reproduced by the heads 1A to 1C. For example, the channel A is reproduced by the heads 1B and 1C as well when the channel A is reproduced by the head 1A. However, only one memory A is present in FIG. 2. Therefore, the interchanger circuit 33A does not know which of the signals 1a to 1c should be written into the memory A. Accordingly, only one third of information is written into the memory A, and the remaining two-thirds of information is discarded.

As a result, the reproduced pictorial image becomes very unnatural.

SUMMARY OF THE INVENTION

An object of the present invention is to eliminate the above described drawback of the prior art device and provide a signal processing device for digital signal reproduction apparatus capable of always restoring the association relations in the variable speed reproduction mode between channels of reproduced signals and channels of the signal processing circuit to their original states even if association relations are interchanged.

In order to achieve such an object, in accordance with the present invention, data divided into plural channels and recorded in plural tracks in parallel, and time division operation is applied to digital signals of plural channels read out from plural tracks for every associated reproduction head and at intervals of predetermined unit time interval. In each unit time interval, digital signals of n consecutive unit (where n is an integer) supplied form associated reproduction heads are multiplexed with a multiplexing factor of n. The above described multiplexed signals of n units supplied from an identical reproduction head are stored in identical addresses of m (m: an interger) memories, respectively. Digital signals supplied from every reproduction head are successively stored in a different address in each memory. Signals stored in identical addresses of the above described respective memories are read out simultaneously and then signals of respective addresses are read out successively.

The present invention thus aims at writing respective signals onto predetermined positions of respective memories without leaving signals of any channel unwritten even if signals of an identical channel are simultaneously reproduced by plural reproduction heads. That is to say, reproduced signals form respective reproduction heads are time-division multiplexed. Signals from an identical reproduction head are written in identical addresses of respective memories, and signals are written in addresses which are different every associated reproduction head. Thereafter, signals are read out in a predetermined address sequence, and signals of a plurality of channels multiplexed are redistributed at predetermined timing for every associated reproduction head. Even if signals of a single channel are reproduced at the same time, therefore, the recorded signals surely differ in time even in the identical channel. That is to say, signals of a single channel differ in address of the memory. Therefore, those signals do not overlap on the memory and are written into predetermined positions.

DESCRIPTION OF THE PREFERRED EMBODIMENTS

Embodiments of the present invention will now be described in detail by referring to appended drawings.

Figure 1:
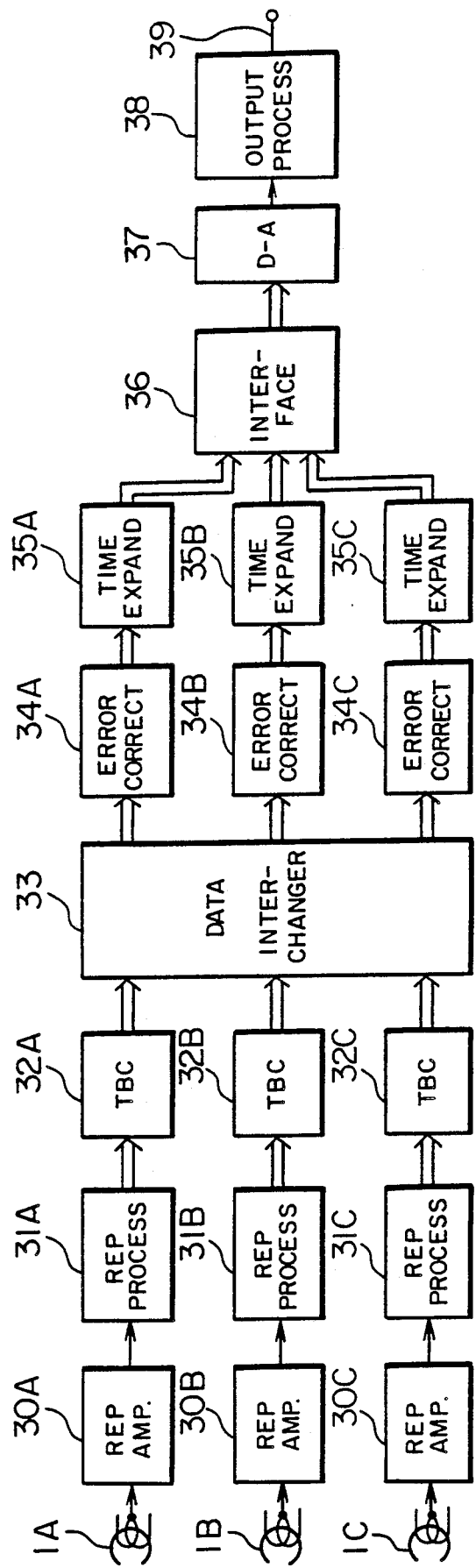
FIG. 1 is a block diagram of the reproduction side of a conventional digital VTR.
Figure 2:
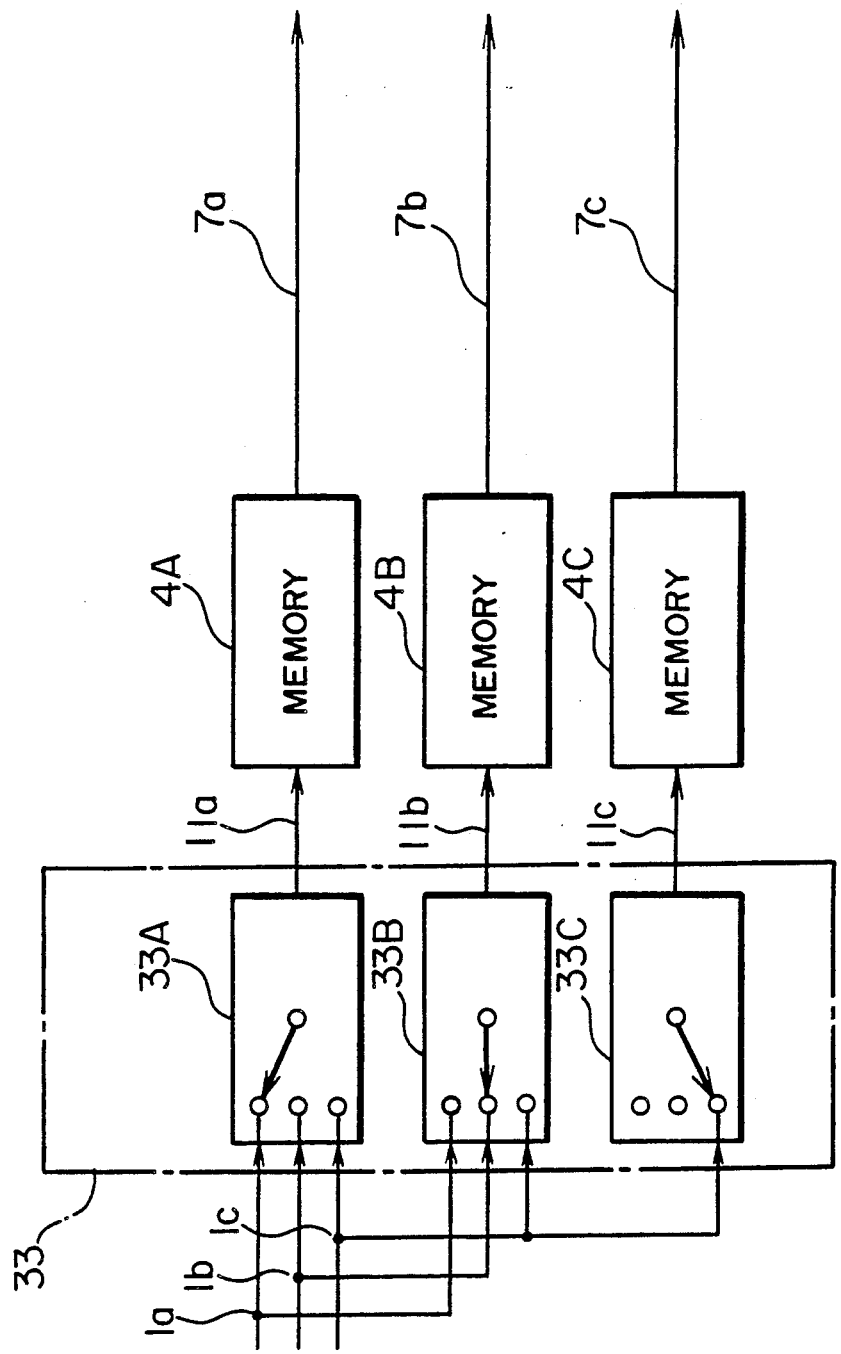
FIG. 2 is a circuit diagram showing the vicinity of an interchanger of FIG. 1.
Figure 3:
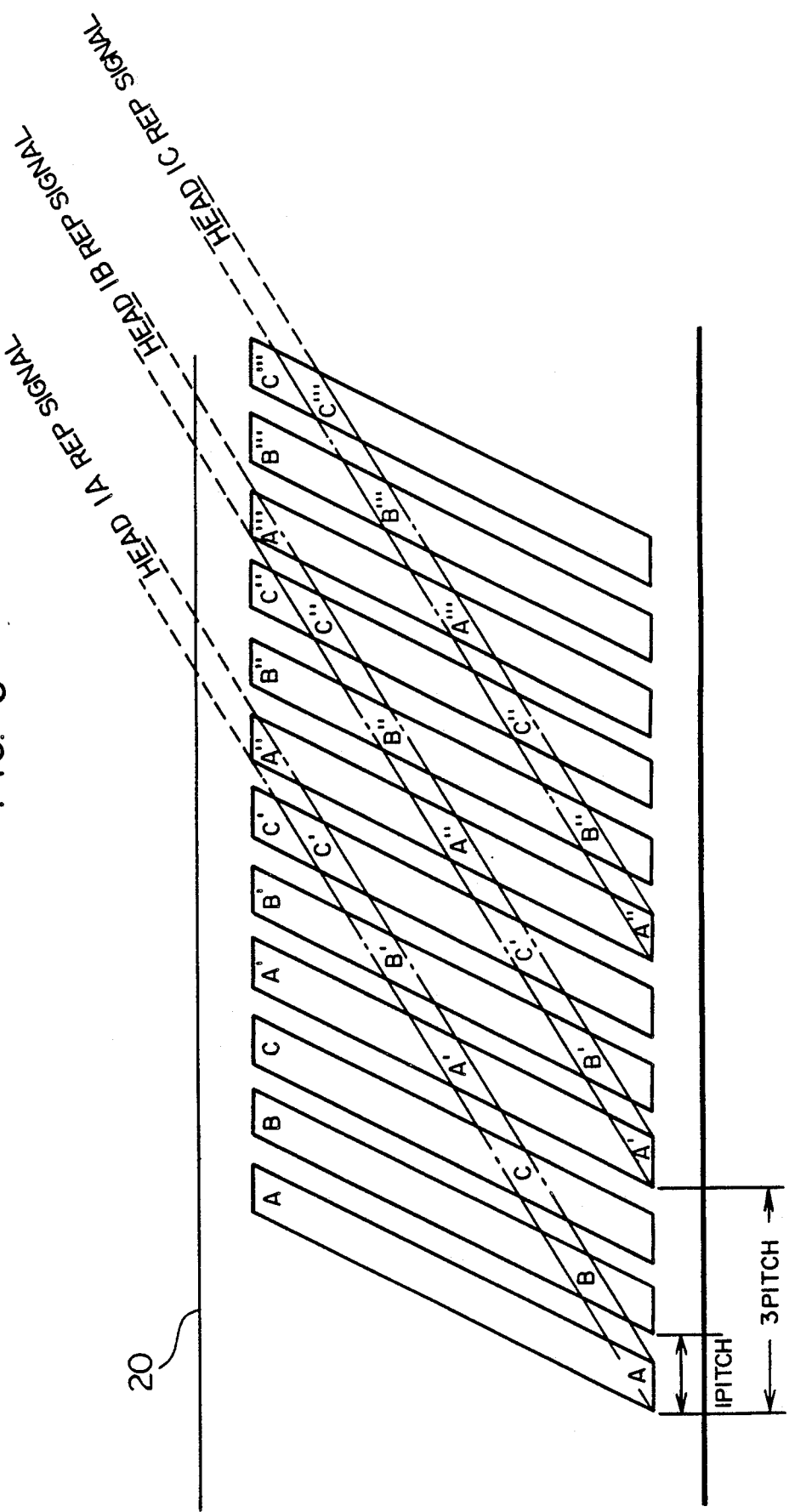
FIG. 3 shows a recording track pattern on digital video tape and a readout pattern of reproduction heads.
Figure 4:
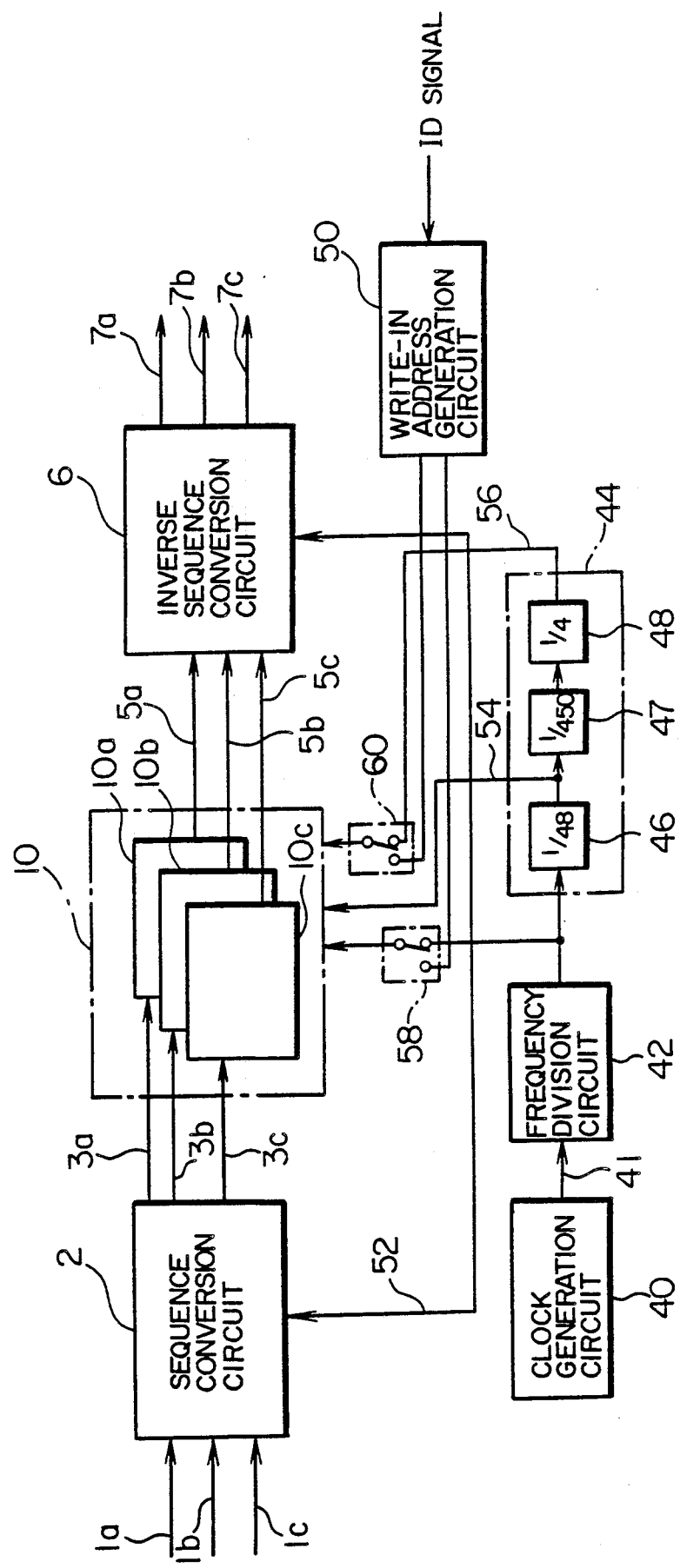
FIG. 4 is a block diagram of a typical embodiment of a signal processing device according to the present invention.

FIG. 4 is a block diagram of a typical embodiment of a signal processing device according to the present invention. In the case of FIG. 4, the present invention has been applied to the reproduction side of a digital VTR. The device illustrated in FIG. 4 can be used instead of the data interchanger 33 and the memories 4A to 4C of the conventional apparatus shown in FIGS. 1 and 2.

In the present embodiment, reproduction of 3-channel digital signals will be described as an example in order to facilitate understanding of the present invention. So long as the number of channels is a natural number not less than two, however, the present invention can be applied regardless of the number of channels. If the number of channels is unity, the present invention is not necessary.

In FIG. 4, input signals 1a, 1b and 1c are digital signals reproduced by heads A, B and C disposed at intervals of, say, 120°. Respective signals are time-division multiplexed by a sequence conversion circuit 2 and are then divided into three-phase parallel signals 3a, 3b and 3c to be supplied to a parallel memory circuit 10.

A memory circuit 10 has three memories such as frame memories 10a, 10b and 10c respectively for storing the signals 3a, 3b and 3c. When data corresponding to one frame have been stored into respective frame memories 10a to 10c, data of respective memories are successively read out and supplied to an inverse sequence conversion circuit 6 as signals 5a, 5b and 5c. The time-division multiplexed signals are converted into parallel signals again in accordance with a processing procedure which is inverse with respect to that of the sequence conversion circuit 2. The resultant parallel signals are outputted as signals 7a, 7b and 7c.

Signals once time-division multiplexed are restored to parallel signals in the inverse sequence conversion circuit 6 and outputted by reason of preventing the excessive rise of operation speed of the memory circuit 10.

The sequence conversion circuit 2 and the inverse sequence conversion circuit 6 are controlled by clock pulses 52 outputted from a frequency division circuit 42. Further, the memory circuit 10 is controlled by address signals 54 and 56 outputted from an address generation circuit 44, which is supplied with clocks outputted from the frequency division circuit 42. The sequence conversion circuit 2 can be implemented by using configuration as shown in FIG. 5, for example.

Figure 5:
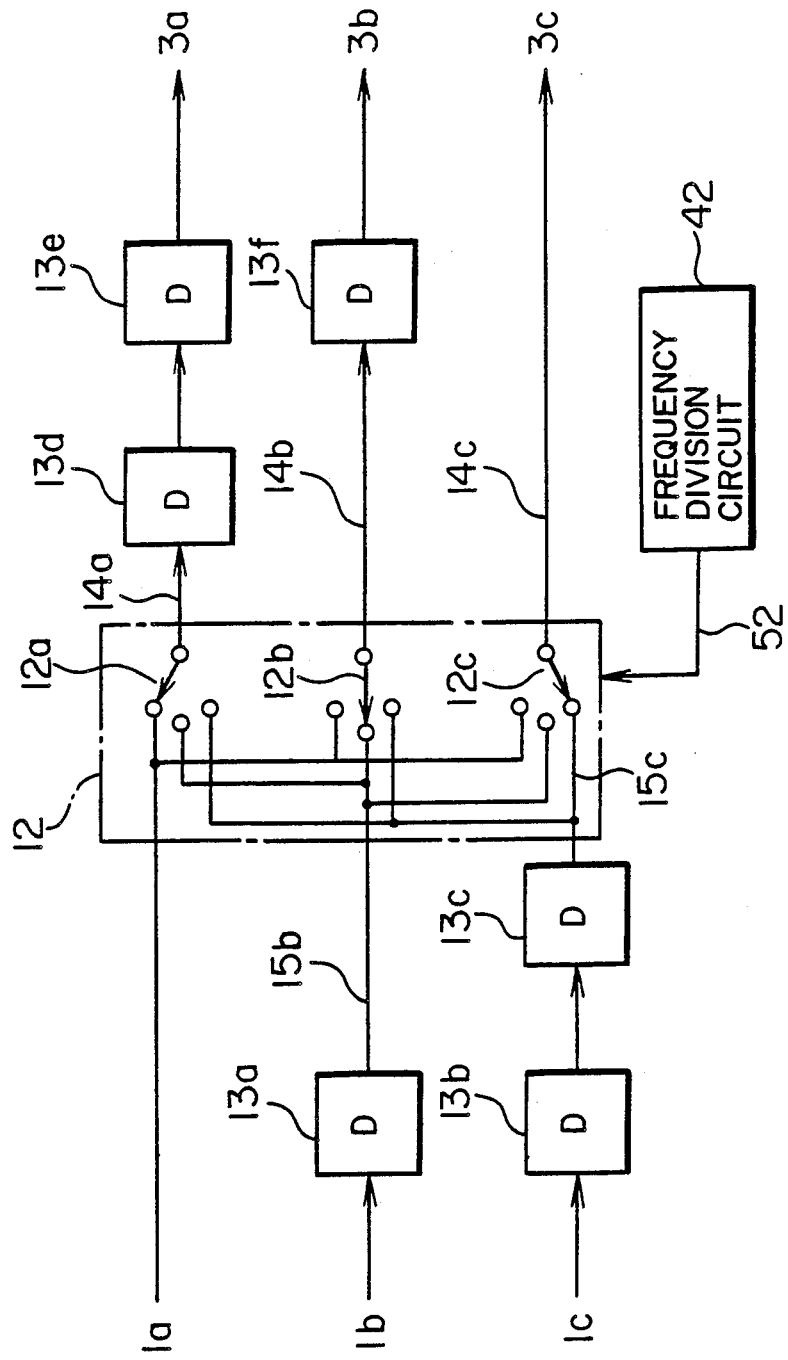
FIG. 5 is a circuit diagram of an example of a sequence conversion circuit.

In FIG. 5, numeral 12 denotes a switch circuit. The switch circuit 12 has three switch elements such as electronic switches 12a, 12b and 12c. Respective switch elements are controlled in synchronism with the clocks 41 and 52.

That is to say, the switch 12b selects the signal 1b and the switch 12c selects the signal 1c when the switch 12a selects the signal 1a. At each clock pulse of the clock 41, the switches 12a, 12b and 12c are so switched as to successively select signals as the signal 1a→1b→1c, the signal 1b→1c→1a, and the signal 1c→1a→1b, respectively. At this time, the input signal 1a is supplied to the switch circuit 12 without delay, whereas the input signal 1b is delayed by one clock in a delay element such as a flip-flop 13a and then supplied to the switch circuit 12, and the input signal 1c is delayed by two clocks in flip-flops 13b and 13c. An output signal 14a of the switch 12a is delayed by two clocks in flip-flops 13d and 13e to generate a signal 3a whereas an output signal 14b of the switch 12b is delayed by one clock in a flip-flop 13f to generate an output signal 3b and an output signal 14c of the switch 12c becomes a signal 3c without delay.

Figure 6:
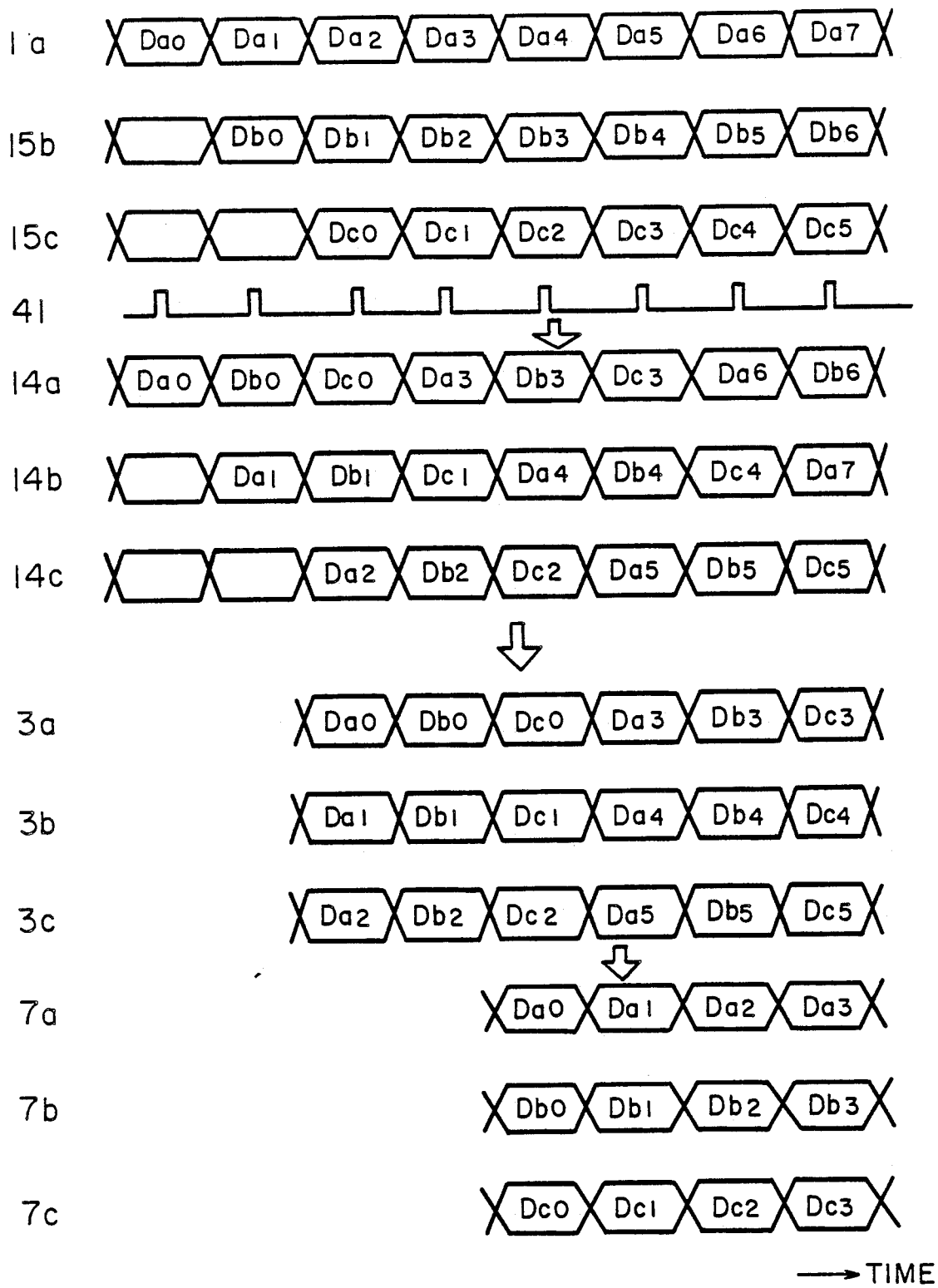
FIG. 6 is a time chart showing signals appearing at various parts of the sequence conversion circuit of FIG. 5.

Signals appearing at various parts of the sequence conversion circuit 2 are shown in a time chart of FIG. 6. In FIG. 6, $D_{a0}$, $D_{a1}$, $D_{a2}$, $D_{a3}$, $D_{a4}$, $D_{a5}$ and so on are 1-byte data of the signal 1a, which is reproduced from the head 1A, with suffix attached in order of time. $D_{b0}$, $D_{b1}$, $D_{b2}$, $D_{b3}$, $D_{b4}$, $D_{b5}$ and so on represent the signal reproduced from the head 1B at the same time. $D_{c0}$, $D_{c1}$, $D_{c2}$, $D_{c3}$, $D_{c4}$, $D_{c5}$ and so on represent the signal reproduced from the head 1C at the same time.

In FIG. 6, only the data portion in the reproduced signal is depicted, and the synchronization signal, the identification signal and the like are omitted.

As evident from FIG. 6, the input signals 1a to 1c of the sequence conversion circuit 2 are equal in timing. However, inputs of the switches 12a to 12c have a mutual time lag of one clock as represented by the signals 1a, 15b and 15c. By switching the signals 1a, 15b and 15c by the switches 12a to 12c, the signals 14a to 14c become three-phase reproduced signals time-division multiplexed for each reproduction head. In the signals 14a to 14c, however, signals reproduced from an identical reproduction head differ in time depending upon the phase. Therefore, signals are shifted in time by the flip-flops 13d to 13f so that only signals reproduced from the identical reproduction head may appear at an identical time as represented by signals 3a to 3c.

The address generation circuit will now be described. A clock generation circuit 40 generates clock pulses having a predetermined frequency, i.e., a frequency synchronized to 1-byte data and supplies the clock pulses to the frequency division circuit 42. The frequency division circuit 42 demultiplies the clock pulses at a ratio of, say, ⅓. The output of the frequency division circuit 42 is supplied to the memory 10 via a switch 58 and is also supplied to a low-order address counter 46 of the address generation circuit 44 to be demultiplied in frequency at a ratio of, say, 1/48. The output of the address counter 46 is supplied to the memory circuit 10. The output of the address counter 46 is also supplied to an address counter 47 to be demultiplied in frequency at a ratio of, say, 1/450. The output of the address counter 47 is supplied to an address counter 48 to be demultiplied in frequency at a ratio of ¼. The output of the address counter 48 is supplied to the memory circuit 10 via a switch 60. In write-in operation to the memory, a write-in address generation circuit 50 converts an identification signal ID of the reproduced signal read out from the reproduction head into clock signals corresponding to the frequency division circuits 42 and 48. The resultant clock signals are supplied to the switches 58 and 60. The identification signal ID represents the track and channel corresponding to the signal.

Therefore, the switches 58 and 60 select the outputs of the address generation circuit 50 in writing operation and select the outputs of the frequency division circuits 42 and 48 in reading operation.

Figure 7:
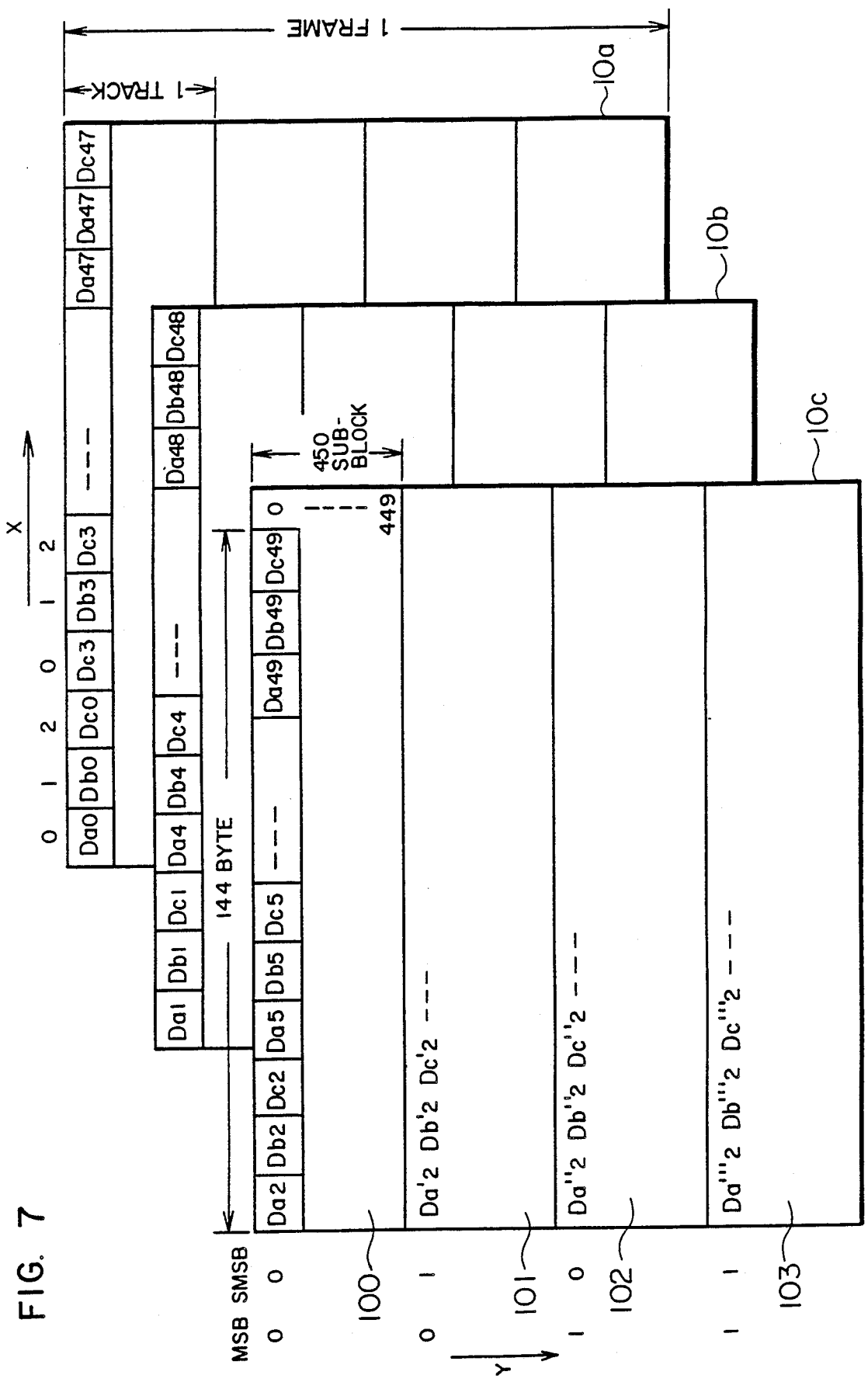
FIG. 7 shows an example of configuration of a memory circuit.

An example of configuration of respective memories of the memory circuit 10 is shown in FIG. 7. Each of the memories 10a to 10c stores data corresponding to one frame comprising, for example, 4 tracks for each channel. It is now assumed that one track comprises, say, 450 subblocks. Further, it is assumed that one subblock comprises, say, 144 bytes.

In response to the output clock supplied from the address generation circuit 50 via the switch 58 in writing operation, therefore, each memory successively stores the signals 3a, 3b and 3c in the x direction byte by byte. That is to say, the address in the x direction corresponds to count (0, 1 and 2) of the frequency division circuit 42. When data $D_{a0}$-$D_{c47}$, $D_{a1}$-$D_{c48}$, and $D_{a2}$-$D_{c49}$ corresponding to one subblock have been stored, each memory passes to the next address in the y direction in response to the output clock of the frequency division circuit 46. Data of the next subclock are thus stored. When data corresponding to four tracks have thus successively been stored, a clock is supplied from the address generation circuit 50 via the switch 60, writing operation being terminated.

In reading operation, data within each subblock in each memory are successively read out byte by byte in the same address order as that of write-in operation, for example, in response to the output of the frequency division circuit 42. When all data within one subblock have been read out, readout of the next subblock is started in response to the clock 54. When data of four tracks have thus been read out, the reading operation is terminated in response to the output 56 of the frequency division circuit 48.

Owing to such configuration, reproduced signals from an identical reproduction head are stored at identical addresses of respective memories in parallel.

Since addresses of reproduced signals from respective reproduction heads are completely separated each other, reproduced signals of respective heads can be switched by only converting the address. That is to say, assuming that the signal reproduced by the head 1A is written into address 1, the signal reproduced by the 1B is written into address (l+1), and the signal reproduced by the head 1C is written into address (l+2). If 1 is added to the address of the reproduction signal of each head in writing operation, in reading operation reproduction signals of the heads 1C, 1A and 1B are read out at readout times of reproduction signals of the heads 1A, 1B and 1C, respectively. If processing which is inverse to that of the sequence conversion circuit 2 is applied to the outputs 5a to 5c of the memory in the inverse sequence conversion circuit 6, reproduction signals of the heads 1C, 1A and 1B are outputted to the outputs 7a, 7b and 7c, respectively. As a result, switching of channels can thus be performed by using only address of the memory.

Figure 8:
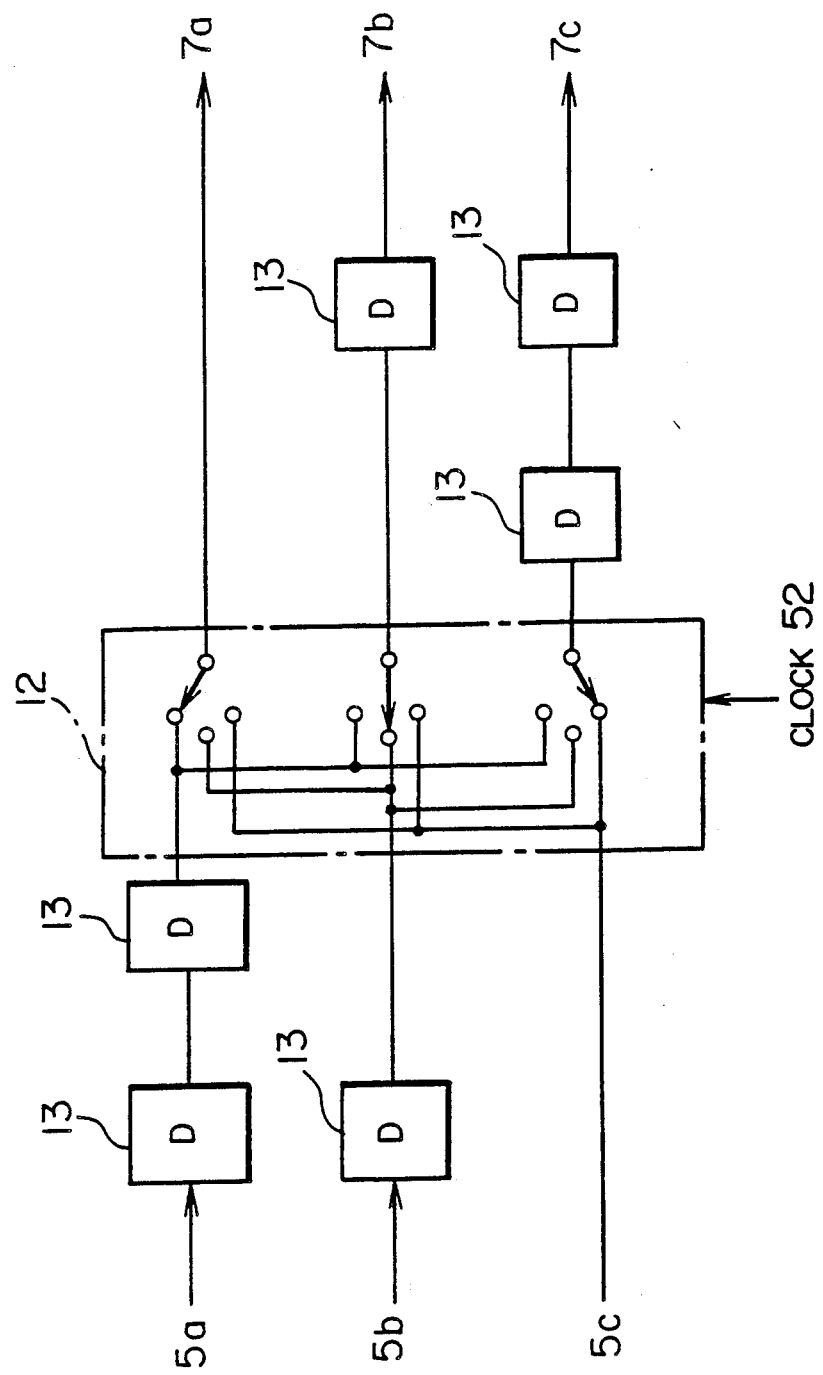
FIG. 8 is a circuit diagram of an example of an inverse sequence conversion circuit.

Configuration of the inverse sequence conversion circuit 6 will now be described by referring to FIG. 8. In FIG. 8, the same numeral as that of FIG. 5 denotes identical function. Further, the output signals 7a, 7b and 7c become respectively reproduction signals of the heads 1A, 1B and 1C as shown in FIG. 6.

Figure 9:
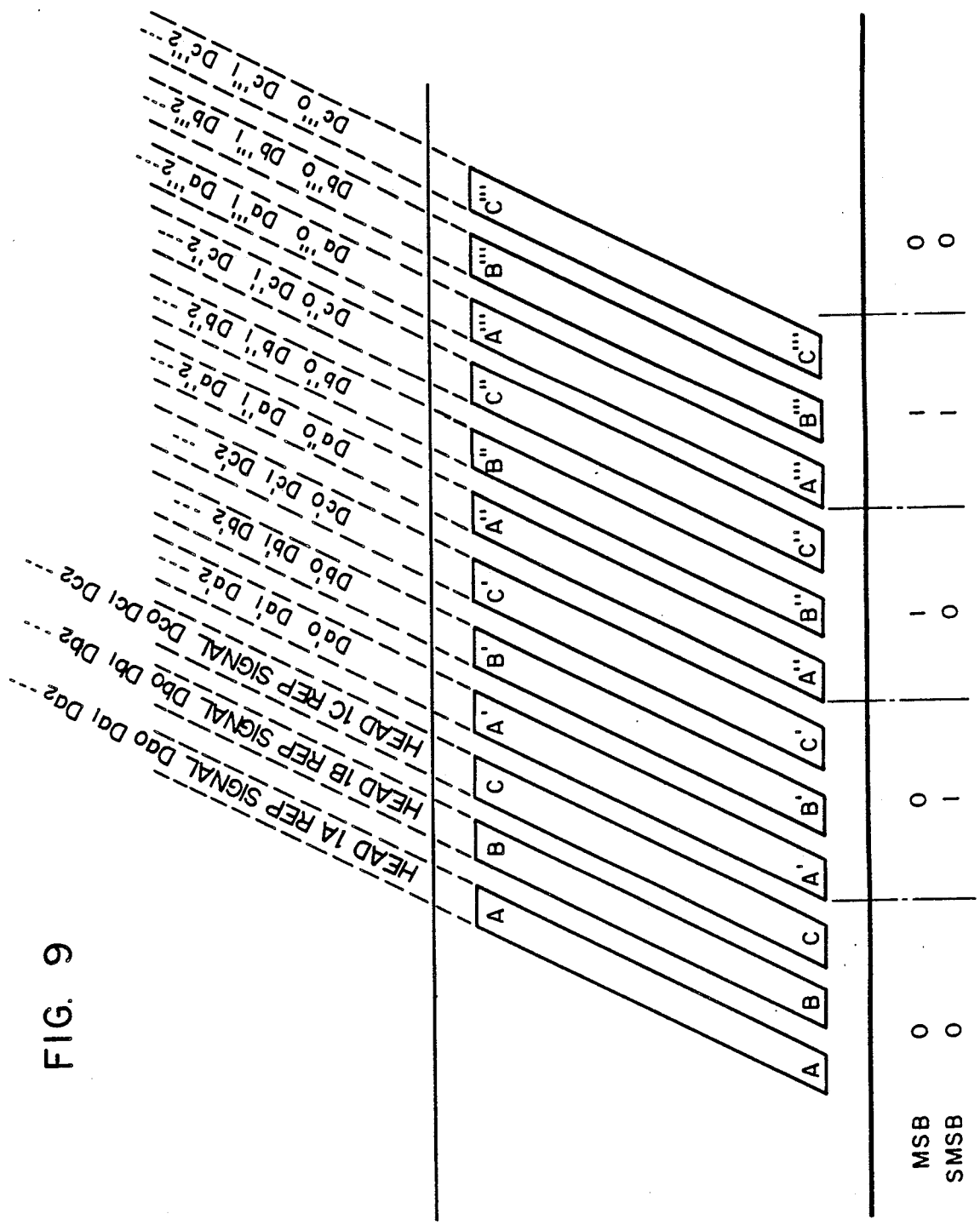
FIG. 9 shows a reproduction pattern of recording tracks in normal reproduction.

Operation of the signal processing device in normal reproduction will now be described by referring to FIG. 9 which shows a reproduction pattern of reproduction heads on a recording track pattern in normal reproduction. Signals of channel a are recorded on tracks A, A', A", A''' and so on. Signals of channel b are recorded on tracks B, B', B", B''' and so on. And signals of channel c are recorded on tracks C, C', C", C''' and so on. Tracks A, A', A" and so on are reproduced by the head 1A whereas tracks B, B', B" and so on are reproduced by the head 1A, and tracks C, C', C" and so on are reproduced by the head 1C. The reproduced signals are supplied to the circuit 2 as the signals 1a, 1b and 1c via circuits 30A to 30C, 31A to 31C and 32A to 32C of FIG. 1. The signals 1a, 1b and 1c time-division multiplexed by the circuit 2 are stored into the memory 10 as shown in FIG. 7. That is to say, signals of identical channels are stored at identical addresses of respective memories 10a to 10c.

When the most significant bit (MSB) and the secondary most significant bit (SMSB) of the address counter 48 are respectively 0 and 0, data of the tracks A, B and C are stored into an area 100. When the MSB and SMSB are respectively 0 and 1, data of the tracks are stored into an area 101. When the MSB and SMSB are respectively 1 and 0, data of the tracks A'', B'' and C'' are stored into an area 102. When the MSB and SMSB are respectively 1 and 1, data of the tracks A''', B''' and C''' are stored into an area 103. Tracks A, A', A'' and A''' are written into such addresses that remainder obtained by dividing address bit of the frequency division circuit 42 by 3 is 0. Tracks B, B', B'' and B''' are written into such addresses that the remainder is 1. And tracks C, C', C'' and C''' are written into such addresses that the remainer is 2.

Figure 10:
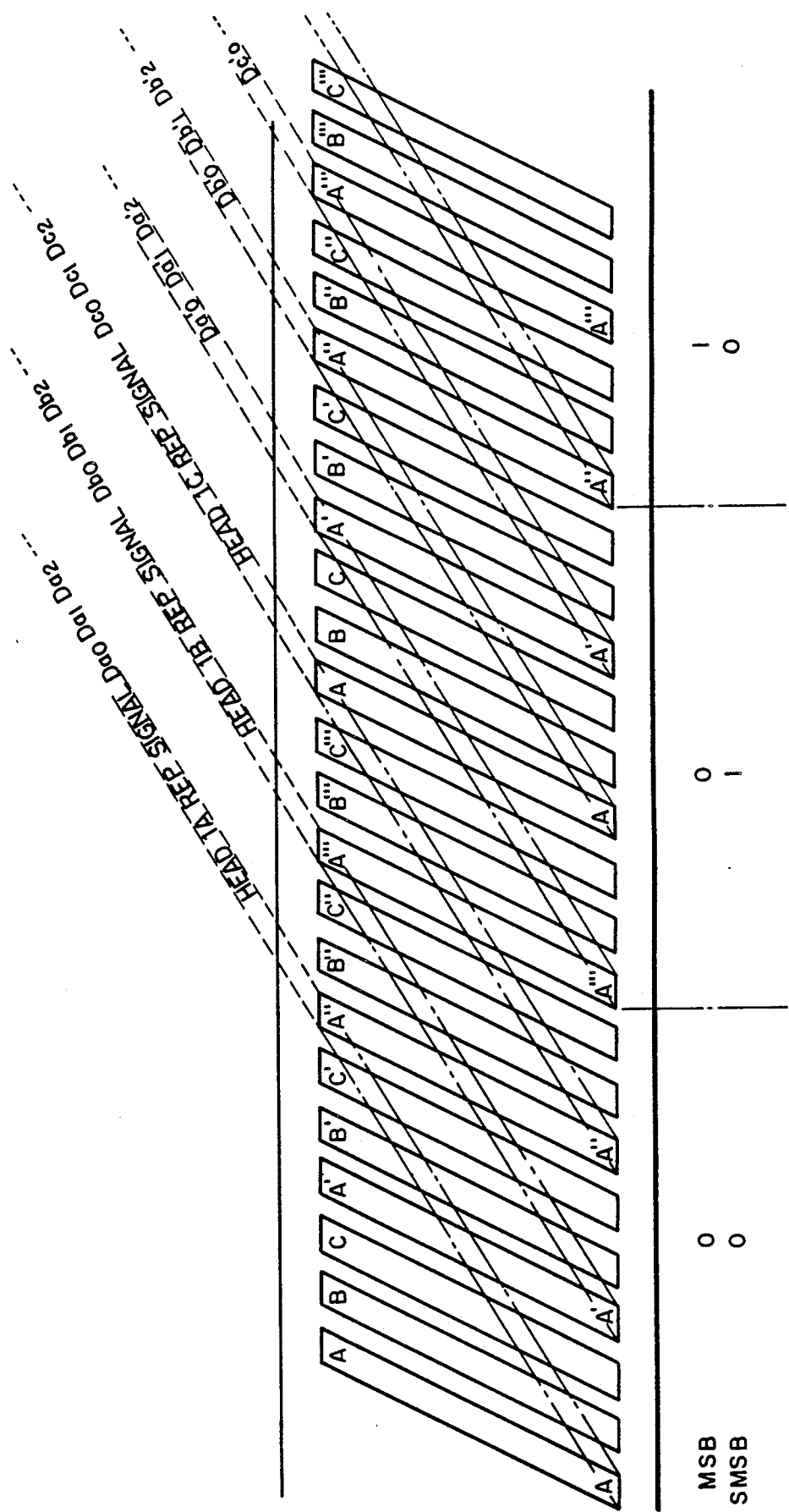
FIG. 10 shows a reproduction pattern of recording tracks in high-speed reproduction.

Operation in the variable speed reproduction mode in which data are reproduced at a tape speed three times faster than that of normal reproduction, for example, will now be described. FIG. 10 shows a reproduction pattern of reproduction heads in this case. As evident from FIG. 10, the heads 1A, 1B and 1C reproduce signals of an identical channel at the same time. When the head 1A scans the track A and reproduces the signal of channel a, for example, the head 1B and 1C scan the tracks A' and A'', respectively. Signals $D_{a0}$, $D_{b0}$ and $D_{c0}$ of the channel a are thus reproduced. As shown in FIG. 7, however, the a-channel signals $D_{a0}$, $D_{b0}$ and $D_{c0}$ are written into different addresses of the memory 10a. None of the signals $D_{a0}$, $D_{b0}$ and $D_{c0}$ thus fail to be written into the memory. In the same way, data of channels b and c are written into different addresses of the memory, respectively. Therefore, none of them fail to be written into the memory.

No matter how signals are interchanged to be supplied to the signal processing device in the variable speed reproduction mode unlike the normal reproduction, therefore, output signals of 7a to 7c correspond to signals at correct positions on the screen.

When the MSB and SMSB of the address counter 47 are respectively 0 and 0, data $D_{a0}$, $D_{a1}$,-; $D_{b0}$, $D_{b1}$-; $D_{c0}$, $D_{c1}$-are stored into the area 100 of respective memories. When the MSB and SMSB are respectively 0 and 1, data $D_{a'0}$, $D_{a'1}$,-; $D_{b'0}$, $D_{b'1}$,-; $D_{c'0}$, $D_{c'1}$- are stored into the area 101 of respective memories. When the MSB and SMSB are respectively 1 and 0, data $D_{a''0}$, $D_{a''1}$,-; $D_{b''0}$, $D_{b''1}$-; $D_{c''0}$, $D_{c''1}$-are stored into the are a 102 of respective memories. When the MSB and SMSB are respectively 1 and 1, data $D_{a'''0}$, $D_{a'''1}$-; $D_{b'''0}$, $D_{b'''1}$-; $D_{c'''0}$, $D_{c'''1}$-are stored into the area 103 of respective memories.

When data corresponding to four tracks have been written into respective memories, then are successively read out to undergo processing, which is inverse to that of the circuit 2, in the circuit 6, resulting in the signals 7a, 7b and 7c as shown in FIG. 6.

In the present embodiment, reproduced signals from respective reproduction heads are thus time-division multiplexed, and signals form an identical reproduction head are written in identical addresses of respective memories. Signals corresponding to every reproduction heads are written in a different address in each memory. Thereafter, signals are read out in a predetermined address sequence, and signals of a plurality of channels multiplexed are redistributed at predetermined timing for every associated reproduction head. Even if signals of a single channel are reproduced at the same time, therefore, the recorded signals surely differ in time even in the identical channel. That is to say, signals of a single channel differ in address of the memory. Therefore, those signals do not overlap on the memory and are written into predetermined positions. Under any head arrangement and any speed, therefore, output signals of heads are not discarded but used effectively. Accordingly, picture quality deterioration hardly changes depending upon the speed.

The sequence of data readout from the memory may be different from the address sequence in writing operation. In this case, however, the inverse sequence conversion circuit 6 performs conversion so that the output signals 7a to 7c may become the same as the input signals 1a to 1c.

In the above described embodiment, 3-channel signals are processed as 3-phase signals. If high-speed operation of the memories is possible, however, 3-channel signals may be processed as 1-phase signals. Configuration of such an embodiment is shown in FIG. 11.

Figure 11:
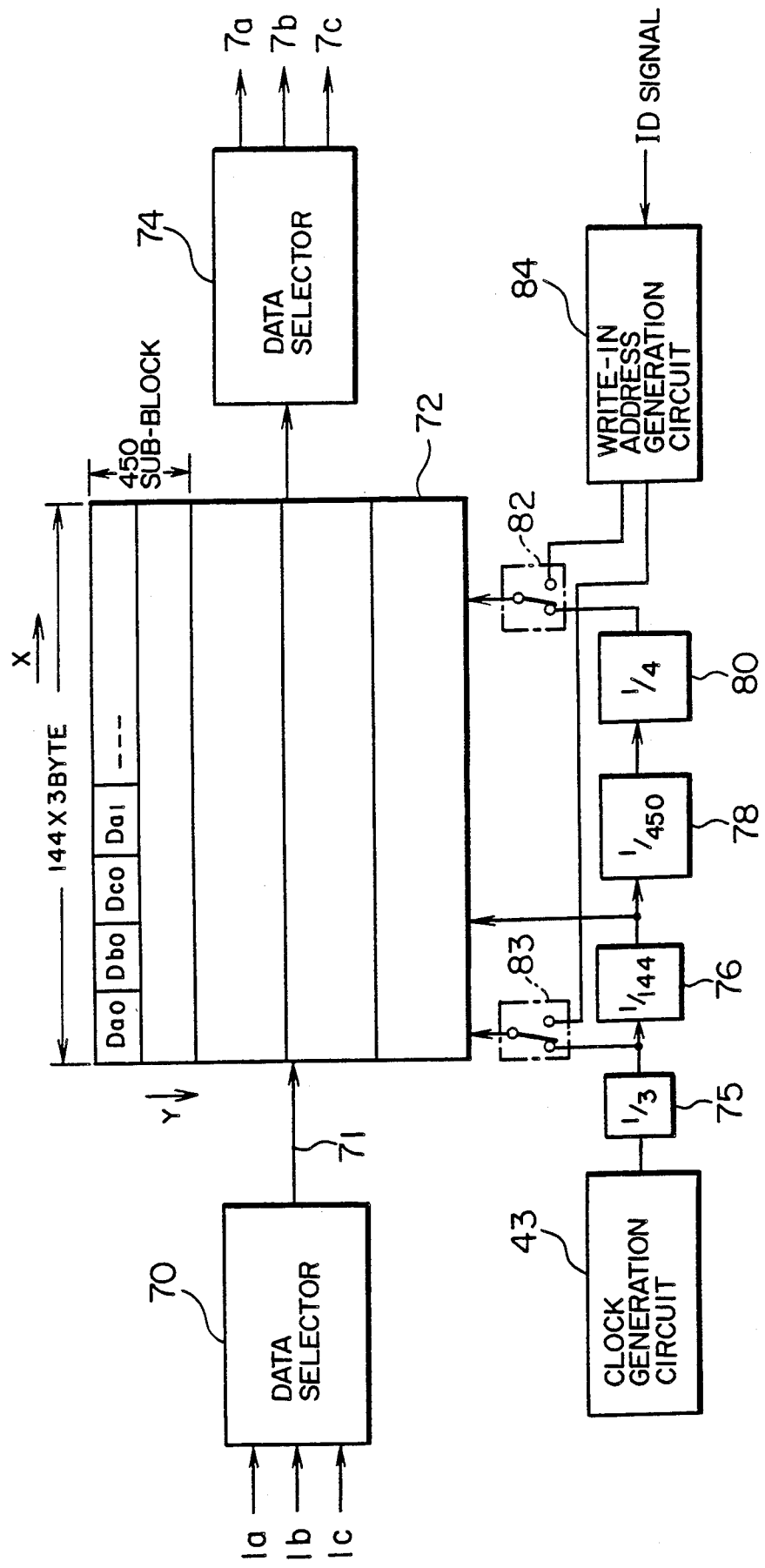
FIGS. 11, 12 and 13 are configuration diagrams of second, third and fourth embodiments of the present invention.

In the embodiment of FIG. 11, the signals 1a, 1b and 1c are inputted to a data selector 70. The data selector 70 performs switching operation at a speed, which is three times faster than that of the switch 12 of the above described embodiment, and successively selects the signals 1a, 1b and 1c. Signals 71 are thus outputted to a memory 72 as $D_{a0}$, $D_{b0}$, $D_{c0}$, $D_{a1}$, $D_{b1}$, $D_{c1}$, $D_{a2}$-.

The memory 72 is a one-phase memory, which accommodates data of 144×3 byte, i.e. as one subblock for each channel, in the X direction and accommodates data of 450×4 subblocks corresponding to one frame in the Y direction. The memory 72 performs the read-out operation and the write-in operation at a speed which is three times faster than that of the memory 10. In the read operation, the memory 72 is controlled by the output of a frequency divider 75, which applies frequency demultiplication with a ratio of $\frac{1}{3}$ to the output of a clock generation circuit 43 for outputting clock pulses at a frequency three times higher than that of the clock generation circuit 40, the output of a frequency divider 76 for applying frequency demultiplication with a ratio of 1/144 to the output of the frequency divider 75, and the output of a frequency divider 80, which applies frequency demultiplication with a ratio of $\frac{1}{4}$ to the output of a frequency divider 78 for applying frequency demultiplication with a ratio of 1/450 to the output of the frequency divider 76. In the write-in operation, the memory 72 is controlled by the output of the frequency divider 76, and signals, supplied from the write address generation circuit 84, respectively corresponding to the output signals of the frequency divider 80 and the frequency divider 75. Switches 82 and 83 are used to change over between the address signal in the write-in operation and that in the read-out operation.

The outputs $D_{a0}$, $D_{b0}$, $D_{c0}$, $D_{a1}$, $D_{b1}$, $D_{c1}$, $D_{a2}$ and so on of the memory 72 are switched by a data selector 74 at a switching speed equivalent to that of the data selector. Data 7a ($D_{a0}$, $D_{a1}$, $D_{a2}$-), 7b ($D_{b0}$, $D_{b1}$, $D_{b2}$-) and 7c , ($D_{c0}$, $D_{c1}$, $D_{c2}$-) are thus outputted.

Figure 12:
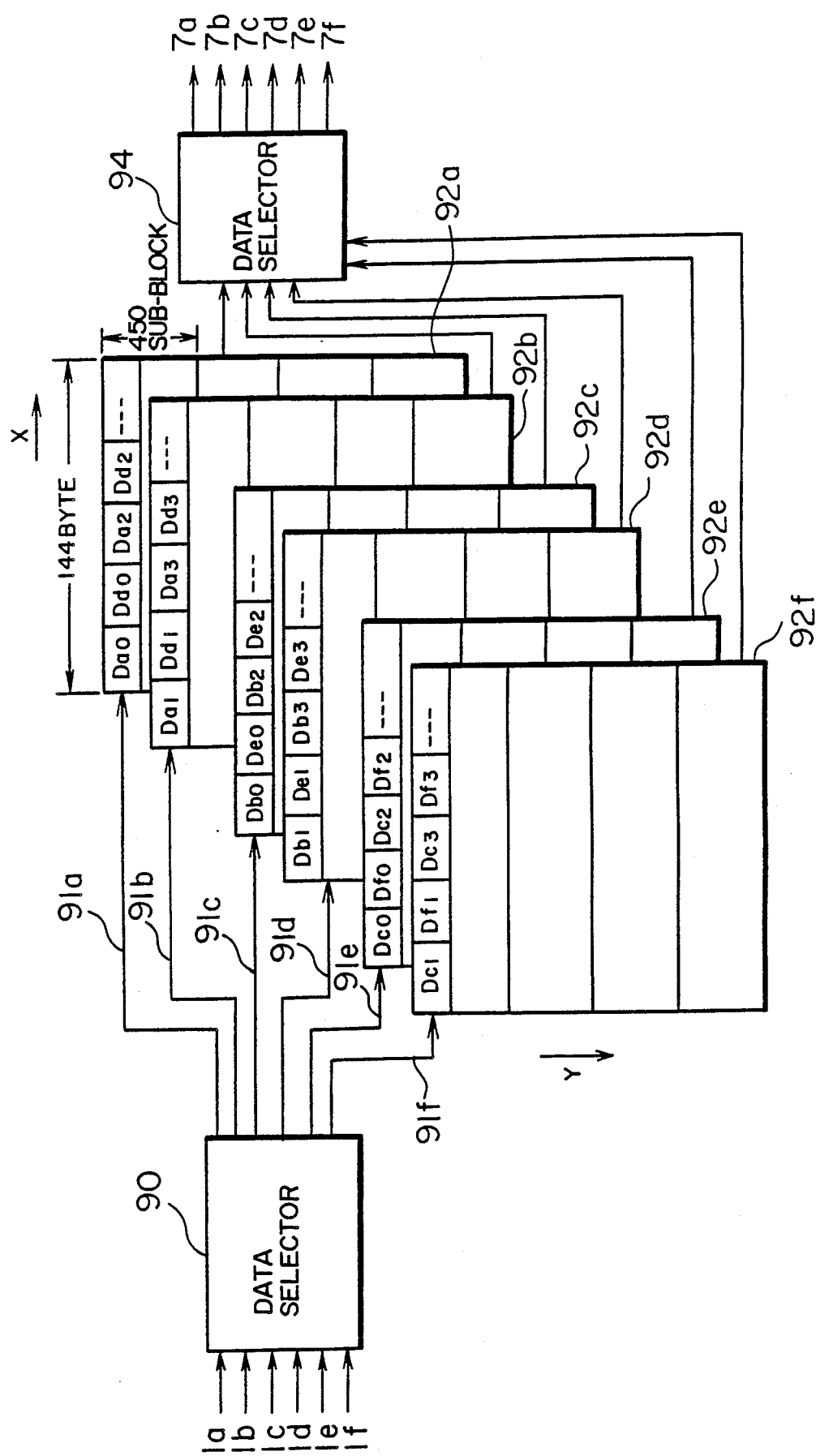

Further, signals of, say, 6 channels can also be processed by using three 2-phase memories or two 3-phase memories. FIG. 12 is a configuration diagram of an embodiment using three 2-phase memories. In the present embodiment, 6-channel reproduced data 1a ($D_{a0}$, $D_{a1}$-), 1b ($D_{b0}$, $D_{b1}$-), 1c ; ($D_{c0}$, $D_{c1}$-), 1d ($D_{d0}$, $D_{d1}$-), 1e ($D_{e0}$, $D_{e1}$-) and 1f ($D_{f0}$, $D_{f1}$-) are successively selected by a data selector 90 at a switching speed equivalent to that of the switch 12. Data $D_a$ and $D_d$ are time-division multiplexed and supplied to a pair of memories 92a and 92b. Data $D_b$ and $D_e$ are time-division multiplexed and supplied to a pair of memories 92c and 92d. Data $D_c$ and $D_f$ are time-division multiplexed and supplied to a pair of memories 92e and 92f. Therefore, the data selector 90 supplies output signals 91a ($D_{a0}$, $D_{d0}$, $D_{a2}$, $D_{d2}$-), 91b ($D_{a1}$, $D_{d1}$, $D_{a3}$, $D_{d3}$-), 91c ($D_{b0}$, $D_{e0}$, $D_{b2}$, $D_{e2}$-), 91d ($D_{b1}$, $D_{e1}$, $D_{b3}$, $D_{e3}$-), 91e ($D_{c0}$, $D_{f0}$, $D_{c2}$, $D_{f2}$-), and 91f ($D_{c1}$, $D_{f1}$, $D_{c3}$, $D_{f3}$-) to the memories 92a to 92f, respectively.

Each of the memories 92a to 92f accommodates data of 144 byte in the X direction and accommodates 450×4 subblocks in the Y direction. All the memories accommodate data of one frame in total.

Reading operation and writing operation are performed with respect to the memory in the same way as the above described respective embodiments. The operation speed is equivalent to that of the memory 10. Data read out from respective memories 92a, 92b, 92c, 92d, 92e and 92f are switched by a data selector 94 which operates with a switching speed equivalent to that of the data selector 90. Output signals 7a to 7f respectively corresponding to the input signals 1a to 1f are thus outputted.

Figure 13:
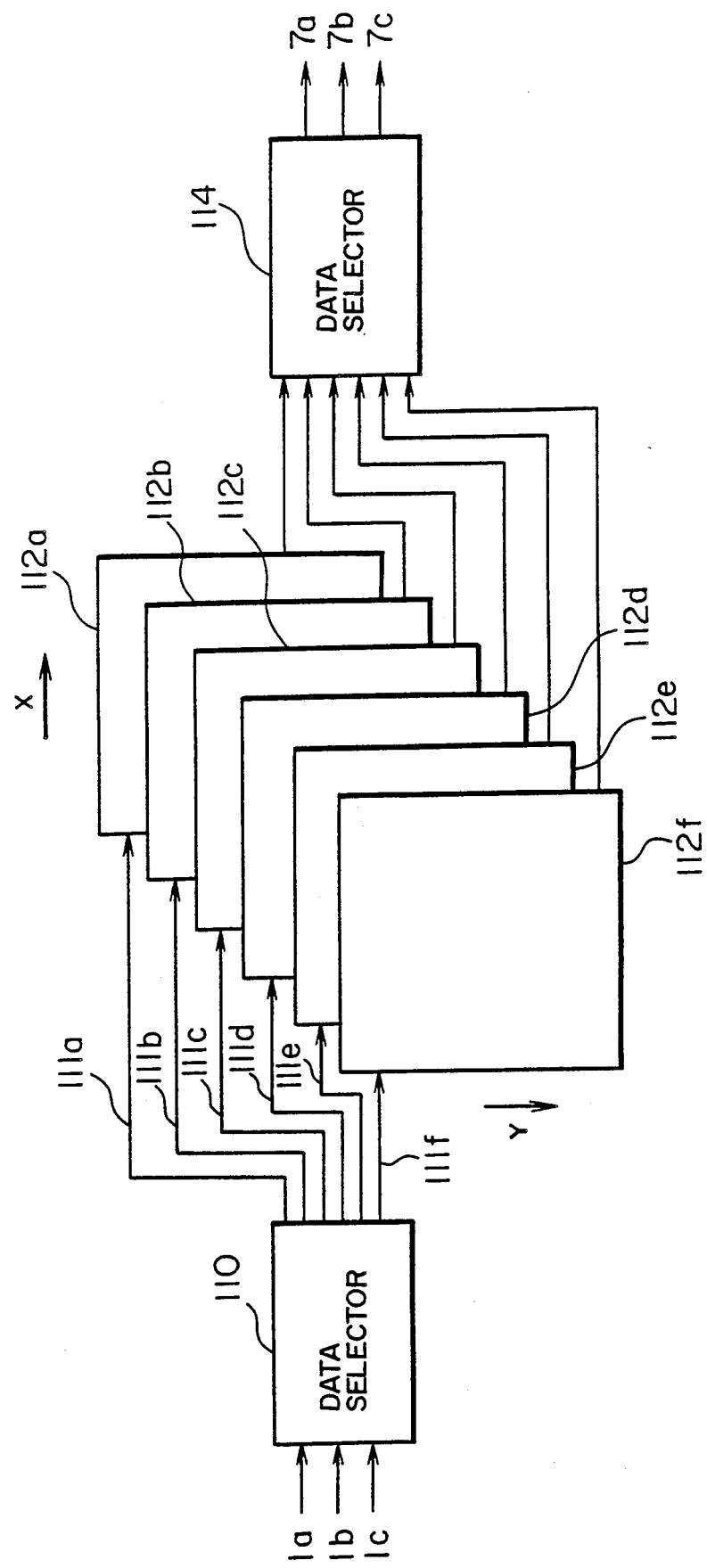

In case the operation speed of memories is slow, a larger number of memories than the number of channels are used. FIG. 13 shows an embodiment in which 3-channel input signals are processed by using 6-phase memories, for example, and the operation speed of memories is reduced to half.

Figure 14:
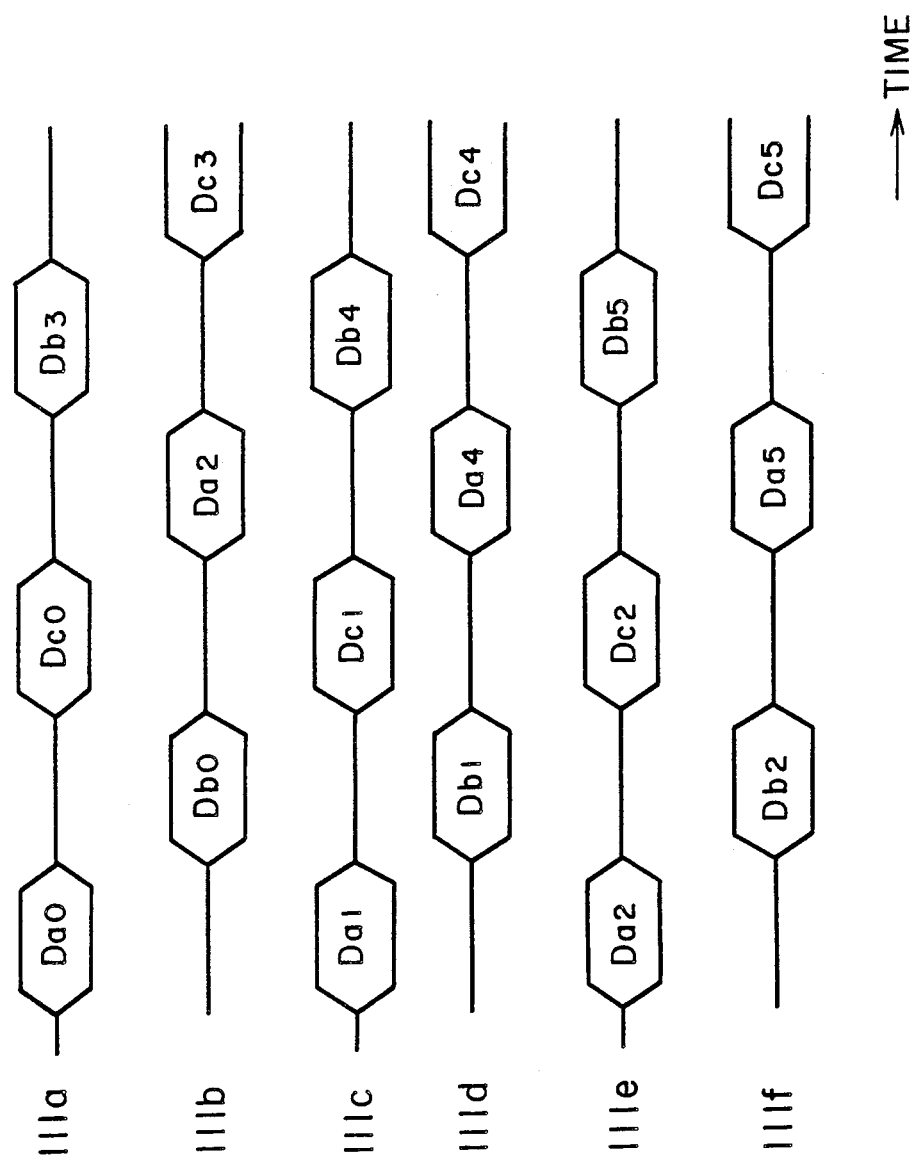
FIG. 14 is a time chart showing signals of the fourth embodiment of the present invention.

A data selector 110 is supplied with the input signals 1a, 1b and 1c and supplies signals 111a to 111f respectively to memories 112a to 112f as shown in FIG. 14. As for the memory capacity, each memory stores data of 144×½ byte as a half subblock in the X direction and data of ½×450×4 subblocks in the Y direction.

A data selector 114 switches outputs of respective memories and sends out signals 7a to 7c.

In the above described respective embodiments, respective reproduction heads are not adjacent. Embodiments 10 in which the present invention is applied to a reproduction apparatus having adjacent reproduction heads.

Figure 15:
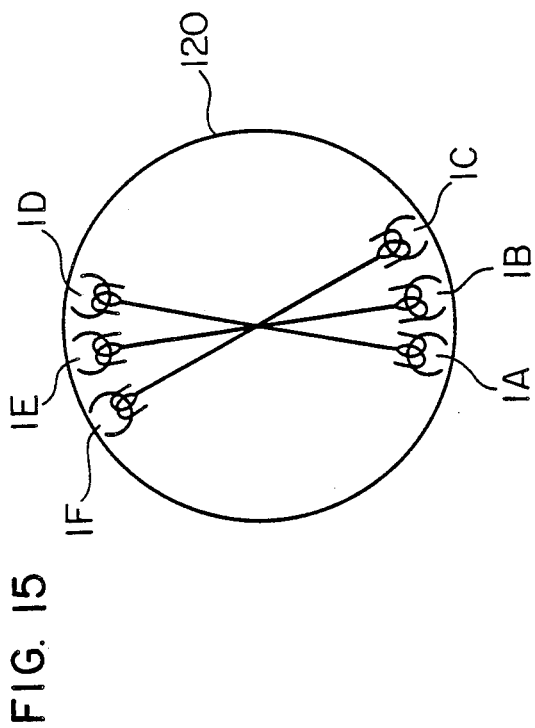
FIG. 15 shows a rotary head of a reproduction apparatus whereto the present invention is to be applied.

FIG. 15 shows an example of a rotary head, which reproduces 6-channel signals. Among six heads 1A, 1B, 1C, 1D, 1E and 1F, the heads 1A, 1B and 1C are adjacent each other while the heads 1D, 1E and 1F are adjacent each other.

Figure 16:
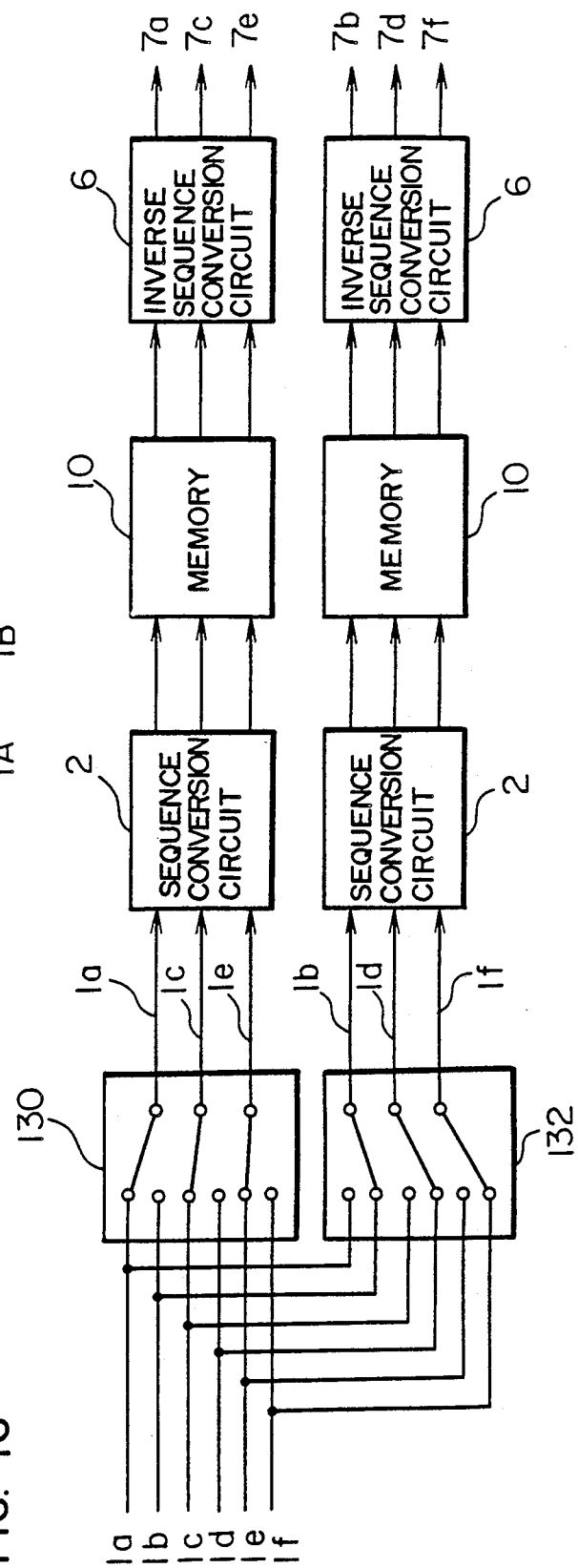
FIG. 16 is a configuration diagram of a fifth embodiment of the present invention.

As shown in FIG. 16, therefore, input signals 1a, 1c and 1e are selected out of input signals 1a to 1f supplied from the reproduction heads 1A to 1F by a switch 130, and input signals 1b, 1d and 1f are selected by a switch 132. Outputs of the switches 130 and 132 are supplied to a sequence conversion circuit 2 having configuration similar to that of FIG. 4 and undergo processing in the same way as FIG. 4.

Each of the above described embodiments shown in FIGS. 11 to 16 demonstrates an effect similar to that of embodiment shown in FIG. 4.

In each of the above described embodiments, the address sequence in memory read-out operation may be made different from the address sequence in memory write-in operation. In that case, the inverse sequence conversion circuit is so configured as to output data in the same order as that of the input signals 1a to 1c.

Although in the above described embodiments the sequence conversion circuit 2 and the inverse sequence conversion circuit 6 are disposed separately from the memory 10, function of the circuits 2 and 6 may be incorporated into the memory.

Figure 17:
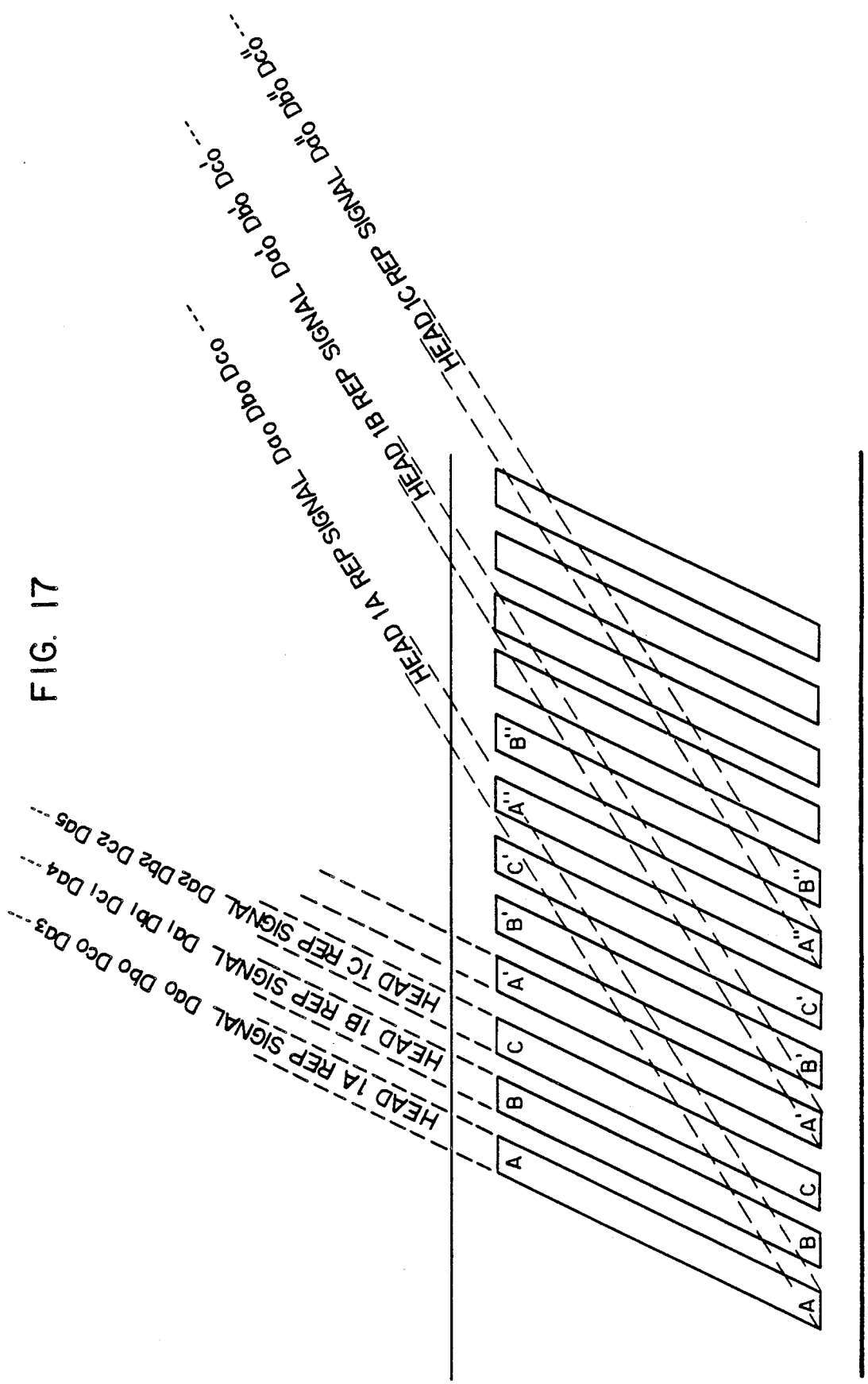
FIG. 17 shows a reproduction pattern of another embodiment in normal reproduction and treble-speed reproduction.

Further, in the above described embodiments, the reproduced input signals 1a to 1c are time-division multiplexed and written into the memory. Instead, however, it is possible to dispose a sequence conversion circuit in the recording side, record time-division multiplexed signals onto a recording medium, and record the input signals 1a to 1f directly into the memory in the reproduction side without disposing the circuit 2. FIG. 17 shows 3-channel data recorded on tape in this case and signals read out in normal reproduction and in treble-speed reproduction.

Owing to the present invention heretofore described, in a digital VTR in which data are divided into a plurality of channels to be recorded and reproduced, all of the reproduced outputs are not discarded but can be used effectively under any head arrangement and any reproduction speed. Accordingly, picture quality deterioration hardly changes depending upon the speed.

Further, the present invention is not limited to digital VTR's but can be applied to apparatuses for recording/reproducing digital signals of a plurality of channels onto/from a plurality of tracks such as a digital audio tape recorder (DAT).

We claim:

1. A signal processing device for use in a digital signal reproduction apparatus which reproduces digital signals in a record medium in which plural channels of digital signals are recorded thereon in plural tracks, said digital signals being reproduced by plural reproduction heads associated with said plural tracks, said signal processing device comprising:

address signal generation means for generating a write-in address signal and a read-out address signal;

memory means comprising m (where m is an integer not less than 2) memories for writing and reading, in response to said write-in address signal and said read-out address signal, digital signals which are read out in parallel from plural tracks of said record medium by said plural reproduction heads, time-divided for every associated reproduction heads, and multiplexed with a multiplexing factor of n (where n is an integer not less than 2), said memories respectively storing signals supplied from an identical reproduction head in identical addresses, each of said memories storing signals supplied from respective reproduction heads in different addresses.

2. A signal processing device according to claim 1, wherein said address signal generation means generates said write-in address signal on the basis of an identification signal included in signals reproduced by said reproduction head.

3. A signal processing device according to claim 1, wherein said memory means writes signals successively into respective memories in a predetermined address sequence in accordance with the write-in address signal supplied from said address signal generation means, and upon completion of the write-in operation, said memory means reads out signals in the same address sequence in accordance with the read-out address signal.

4. A signal processing device for use in a digital signal reproduction apparatus which reproduces digital signals recorded in a record medium in which plural channels of digital signals are recorded thereon in separate tracks each associated with corresponding one of the plural channels, said digital signals being reproduced by plural rotary reproduction heads associated with said respective channels, said signal processing device comprising:
- address signal generation means for generating a first address signal, and second and third address signals related to said first address signal by frequency demultiplication;
- data sequence conversion means for applying time-division operation to digital signals of plural channels read out in parallel from plural tracks of said record medium by said plural reproduction heads, for every associated reproduction head, in response to said first address signal, and at intervals of predetermined unit time interval and for multiplexing digital signals of n consecutive units (where n is an integer not less than 2) supplied from associated reproduction heads with a multiplexing factor of n in each unit time interval;
- memory means comprising m (where m is an integer) memories and storing said multiplexed signals of n units supplied from an identical reproduction head respectively in identical addresses of m memories simultaneously in response to said second address signal, signals supplied from every reproduction head being successively stored in a different address in each memory, and upon storing data in all addresses of respective memories said memory means reading simultaneously signals stored in identical addresses of respective memories in accordance with said third address signal and then reading digital signals of respective addresses successively; and
- inverse sequence conversion means for applying sequence conversion processing to signals read out from said memory means so as to make them equivalent to input signals of said sequence conversion means and for outputting digital signals separately for signals of every reproduction head.

5. A signal processing device according to claim 4, wherein said address signal generation means generates said second address signal on the basis of an identification signal included in signals reproduced by said reproduction head.

6. A signal processing device according to claim 4, wherein said memory means writes signals successively into respective memories in a predetermined address sequence in accordance with the second address signal supplied from said address signal generation means, and upon completion of the write-in operation, said memory means reads out signals in the same address sequence in accordance with the third address signal.

7. A signal processing device according to claim 6, wherein said inverse sequence conversion means performs processing which is inverse with respect to that performed by said sequence conversion means.

8. A signal processing device for use in a digital signal reproduction apparatus which reproduces digital signals recorded in a record medium in which plural channels of digital signals are recorded thereon in separate tracks each associated with corresponding one of the plural channels, said digital signals being reproduced by plural reproduction heads associated with said respective channels, said signal processing device comprising:
- sequence conversion means for applying time-division operation to digital signals of plural channels read out in parallel from plural tracks of said record medium by said plural reproduction heads, for every associated reproduction head and at intervals of predetermined unit time interval and for multiplexing digital signals of n consecutive units (where n is an integer not less than 2) supplied from associated reproduction heads with a multiplexing factor of n in each unit time interval;
- memory means comprising m (where m is an integer not less than 2) memories;
- write-in means for storing said multiplexed signals of n units supplied from an identical reproduction head respectively into identical addresses of m memories and for storing signals supplied from every reproduction head successively into a different address in each memory;
- read-out means for reading simultaneously signals stored in identical addresses of respective memories of said memory means and then reading signals of respective addresses successively; and
- inverse sequence conversion means for applying sequence conversion processing to digital signals read out from said memory means so as to make them equivalent to input signals of said sequence conversion means and for outputting digital signals separately for signals of every reproduction head.

9. A signal processing device according to claim 8, wherein a write-in address signal to said memory is generated on the basis of an identification signal included in signals reproduced by said reproduction head.

10. A signal processing device according to claim 8, wherein said write-in means writes signals successively into respective memories in a predetermined address sequence in accordance with a write-in address signal, and upon completion of the write-in operation, said read-out means reads out signals in the same address sequence in accordance with a read-out address signal.

11. A signal processing device according to claim 10, wherein said inverse sequence conversion means performs processing which is inverse with respect to that performed by said sequence conversion means.

12. A signal processing method for a digital signal reproduction apparatus which reproduces digital signals recorded in a record medium in which plural channels of digital signals are recorded thereon in separate tracks each associated with corresponding one of the plural channels, said digital signals being reproduced by plural rotary reproduction heads associated with said respective channels, said method comprising:
- a first step of applying time-division operation to digital signals of plural channels read out from plural tracks of said record medium by said plural reproduction heads, for every associated reproduction head and at intervals of predetermined unit time interval and of multiplexing digital signals of n consecutive units (where n is an integer) supplied from associated reproduction heads with a multiplexing factor of n in each unit time interval;
- a second step of storing said multiplexed signals of n units supplied from an identical reproduction head respectively in identical addresses of m (where m is an integer) memories and of storing digital signals supplied from every reproduction head successively in a different address in each memory;
- a third step of reading out simultaneously signals stored in identical addresses of said respective memories and of then reading out signals of respective addresses successively; and a fourth step of applying sequence conversion processing to digital signals read out from said respective memories so as to make them equivalent to reproduced signals supplied from respective reproduction heads and of outputting digital signals separately for signals of every reproduction head.

13. A signal processing method according to claim 12, wherein said second step comprises a step of generating a write-in signal on the basis of an identification signal included in signals reproduced by said reproduction head.

14. A signal processing method according to claim 12, wherein said respective memories write signals successively into respective memories in a predetermined address sequence in accordance with a write-in address signal, and upon completion of the write-in operation, said respective memories read out signals in the same address sequence in accordance with a read-out address signal.

15. A signal processing method according to claim 12, wherein processing performed at said fourth step is inverse with respect to processing performed at said first step.

16. A signal processing device for use in a digital signal reproduction apparatus which reproduces digital signals in a record medium in which plural channels of digital signals are recorded thereon in plural tracks, said plural channels of digital signals being reproduced by plural reproduction heads associated with said plural tracks, respectively, said signal processing device comprising:
- address signal generation means for generating a write-in address signal and a read-out address signal;
- multiplexing means for applying time division multiplexing operation to said plural channels of digital signals reproduced by said plural reproduction heads; and
- memory means for writing and reading, in response to said write-in address signal and said read-out address signal, the time division multiplexed digital signals applied from said multiplexing means in a manner that the digital signals of different channels are stored in different addresses.

17. A signal processing device according to claim 16, wherein said address signal generation means generates said write-in address signal on the basis of an identification signal included in signals reproduced by said reproduction head.

18. A signal processing device according to claim 16, wherein said memory means writes the digital signals in a predetermined address sequence in accordance with the write-in address signal supplied from said address signal generation means, and after completion of the write-in operation, said memory means reads out signals in the same address sequence in accordance with the read-out address signal.

19. A signal processing device for use in a digital signal reproduction apparatus which reproduces digital signals in a record medium in which plural channels of digital signals are recorded thereon in plural tracks, said plural channels of digital signals being reproduced by plural reproduction heads associated with said plural tracks, respectively, said signal processing device comprising;
- address signal generation means for generating a write-in address signal and a read-out address signal;
- multiplexing means for applying time division multiplexing operation to said plural channels of digital signals, which are read out in parallel from plural tracks of said record medium by said plural reproduction heads, for every channel of the digital signals with a multiplexing factor of n (wherein n is an interger not less than 2); and
- memory means comprising m (where m is an integer) memories for writing and reading, in response to said write-in address signal and said read-out address signal, the time division multiplexed digital signals applied from said multiplexing means in a manner that the digital signals of the same channel are stored in the same addresses and the digital signals of different channels are stored in different addresses.

20. A signal processing device according to claim 19, wherein said address signal generation means generates said write-in address signal on the basis of an identification signal included in signals reproduced by said reproduction head.

21. A signal processing device according to claim 19, wherein said memory means written the digital signals successively into respective memories in a predetermined address sequence in accordance with the write-in address signal supplied from said address signal generation means, and after completion of the write-in operation, said memory means reads out signals in the same address sequence in accordance with the read-out address signal.

* * * * *